United States Patent [19]

Hobbs et al.

[11] 4,319,488

[45] Mar. 16, 1982

[54] ACCELEROMETER

[75] Inventors: Larry P. Hobbs, Brentwood; Harold D. Morris, Orinda; Scott F. Voelker, Concord, all of Calif.

[73] Assignee: Systron-Donner, Concord, Calif.

[21] Appl. No.: 174,687

[22] Filed: Aug. 1, 1980

[51] Int. Cl.$^3$ ............................................. G01P 15/08
[52] U.S. Cl. .................................... 73/509; 73/517 B
[58] Field of Search ............. 73/517 B, 517 R, 516 R, 73/509

[56] References Cited

U.S. PATENT DOCUMENTS 3,001,406  9/1961  Oyhns ............................. 73/516 R
3,618,402  11/1971  Kase ................................. 73/517 B

*Primary Examiner*—James J. Gill
*Attorney, Agent, or Firm*—Flehr, Hohbach, Test

[57] ABSTRACT

The technique for replacing certain components in a linear accelerometer with an arrangement compatible with all of the other components making up the accelerometer is disclosed herein. The components that are replaced include a potentiometer and mechanical acceleration sensing means which cooperate with one another and which operate on a DC excitation voltage for producing an initial voltage dependent on both the acceleration sensed and the excitation voltage. The arrangement replacing these latter components include acceleration sensing means operating on the same DC excitation voltage for producing an initial voltage which is dependent on the acceleration but which is independent of the excitation voltage and means for adding a percentage of the excitation voltage to this latter voltage for providing a voltage which is dependent on both the acceleration sensed and the excitation voltage, thereby making the arrangement compatible with those components in the accelerometer which have not been replaced.

9 Claims, 2 Drawing Figures

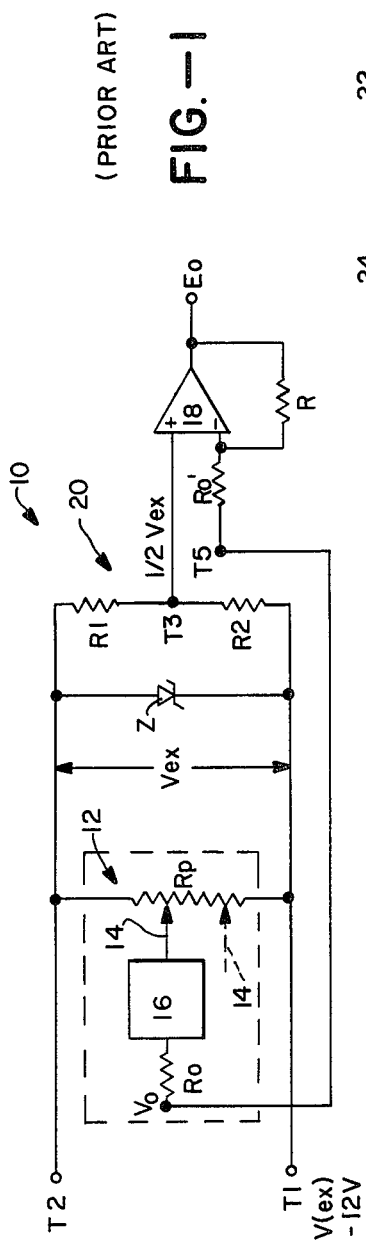
FIG.—1 (PRIOR ART)
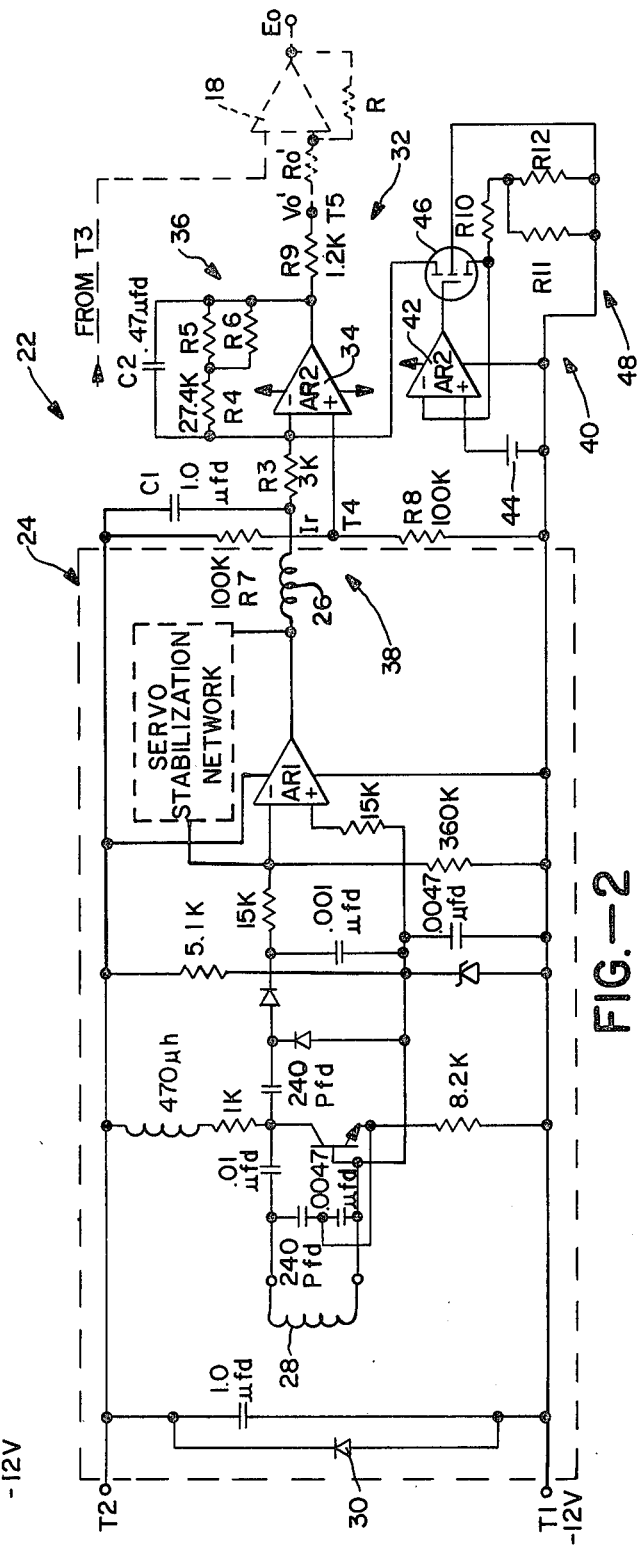
FIG.—2

ACCELEROMETER

The present invention relates generally to accelerometers and more particularly to a technique for replacing certain components in an existing linear accelerometer with an improved arrangement which is compatible with the components not replaced.

Referring to FIG. 1, an existing (prior art) linear accelerometer is schematically illustrated and generally indicated by the reference numeral 10. Actually, an overall accelerometer arrangement is shown with the accelerometer in the dotted box. However, for purposes of the present description, the entire arrangement will be referred to as an accelerometer. This accelerometer is especially suitable for use in an automatic guidance system in an aircraft or missile and, in fact, is presently incorporated in a missile guidance system. As seen in FIG. 1, this accelerometer includes a source of excitation voltage V(EX) (not shown) which is applied across terminals T1 and T2 and which is stabilized by means of a Zener diode Z. In the embodiment illustrated, the excitation voltage is negative 12 volts DC. Accelerometer 10 also includes a potentiometer 12 having a resistive element Rp connected across the Zener diode, e.g., across the excitation voltage V(EX) and a slide element 14 mounted for movement along the entire length of and in engagement with the resistive element. A mechanical mechanism 16 for sensing acceleration is appropriately connected to slide element 14 for placing the latter in a particular position along the resistive element Rp depending upon the acceleration sensed. In this way, the voltage $V_O$ at slide element 14, e.g., at the output of the accelerometer as generally indicated by the output impedance $R_o$, has an amplitude which is proportionate to the acceleration sensed and dependent on the amplitude of excitation voltage V(EX). In an actual embodiment, accelerometer 10 is utilized to sense the vertical component of acceleration and mechanism 16 is vertically mounted to sense an acceleration of 1 G (32.2 feet/second$^2$) when at rest in earth's gravity. In the accelerometer illustrated in FIG. 1, the potentiometer 12 and the mechanical mechanism 16 cooperate with one another so that slide element 14 is centrally located along the length of resistive element Rp when the mechanical mechanism senses 1 G acceleration, e.g., when the overall accelerometer is at rest in earth's gravity. In this null mode, the voltage $V_O$ is equal to exactly one half of the excitation voltage V(EX). Where the excitation voltage is negative 12 volts as in the embodiment illustrated in FIG. 1, $V_O$ equals −6 volts. Should the accelerometer be subjected to an actual vertical acceleration with respect to the earth, for example an acceleration of ½G above 1 G, mechanism 16 will cause the slide element to move one quarter of the way down the respective element and the voltage $V_O$ will equal the sum of one half the excitation voltage plus (or minus) that due to the acceleration sensed (over and above 1 G) or in the case illustrated, −9 volts DC.

As seen in FIG. 1, the voltage $V_O$ is applied to one input of a differential amplifier 18 through amplifier resistor $R_o$. The other input of the amplifier is connected to the center terminal T3 of a voltage divider 20 consisting of resistors R1 and R2 connected across Zener diode Z. The values of resistors R1 and R2 are selected to provide a voltage at T3 equal to the voltage $V_O$ at zero acceleration. Therefore, in the embodiment illustrated, the voltage at center terminal T3 is one half the excitation voltage, e.g., negative 6 volts when the excitation voltage is negative 12 volts, and, hence, the resistors R1 and R2 are equal to one another in this case. Operational amplifier 18 provides an output signal $E_O$ having an amplitude proportionate to both the acceleration sensed and the excitation voltage. In other words, in the example illustrated, when at rest, the voltage $V_O$ is one half the excitation voltage or −6 volts. Since the voltage at T3 is also one half the excitation voltage or −6 volts, the output $E_O$ is zero with respect to the voltage at T3. As the acceleration sensed actually changes from its 1 G nulled level, an actual voltage difference results at the input of amplifier 18, resulting in a positive (or negative) value for output $E_O$.

Should the excitation voltage change amplitude, for example, as a result of a change in temperature of the Zener diode, this change is compensated for by the circuitry in accelerometer 10. More specifically, a change of for example 2 volts, from negative 12 volts to negative 10 volts, across the Zener diode will cause the voltage $V_O$ to change but it will also cause the center terminal T3 to change. In the example just recited, $V_O$ at its null level, when at rest, will be −5 volts DC rather than −6 volts. However, the voltage at terminal T3 will also be −5 volts, thereby providing no signal at the output of the differential amplifier with respect to the voltage at T3.

With two exceptions, the accelerometer just described is satisfactory for its intended purpose.

The first of these two exceptions relates to the utilization of potentiometer 12 and mechanical acceleration sensing mechanism 16. More specifically, the potentiometer is subject to wear between its resistive element and movable slide element, even during periods when the slide element does not move across the resistive element. This results because the two are susceptible to wear or damage from applied vibrations even under power-off conditions. As a result, the useful operating life of the potentiometer and therefore the overall accelometer is relatively short. One suggested way of overcoming this problem has been to provide some sort of mechanical means for reducing the wear at the potentiometer physically by separating the two elements during periods of non-use. This has been found to be complicated and unreliable. Another way to eliminate the problem has been to replace the entire accelerometer with one which does not utilize a potentiometer and hence does not suffer from the wearout problem.

However, the more conventional pendulous accelerometer such as one disclosed in U.S. Pat. No. 3,618,402 cannot be used as a direct replacement for the potentiometer and associated mechanism 16. This is because the output of the pendulous accelerometer corresponding to the acceleration sensed is itself independent of the accelerometer's excitation voltage and is thus insensitive to changes in excitation voltage in contrast to the voltage $V_O$ at the output of the potentiometer comprising part of the previously filed invention accelerometer 10. On the other hand, it has been suggested that the potentiometer and mechanical acceleration sensing mechanism be replaced with the more sophisticated arrangement disclosed in U.S. Pat. No. 3,722,293. This latter arrangement eliminates the potentiometer and the problems resulting therefrom by producing an output signal which is sensitive to the excitation voltage as is voltage $V_O$ and, hence, from this standpoint would be compatible with differential amplifier 18. However, this arrangement is also complicated, relatively costly, and it does not utilize all of the other existing components of accelerometer 10, especially the existing relatively low excitation voltage supply.

The second exception to the otherwise satisfactory operation of accelerometer 10 resides in the fact that the pre-set scale across the potentiometer actually varies with a change in amplitude of the excitation voltage causing a slight discrepancy in the output of the differential amplifier. By way of example, when the excitation voltage is at $-12$ volts, at one G acceleration, $V_O$ equals $-6$ volts and the voltage at T3 is at $-6$ volts, as stated previously. At the same excitation voltage and an acceleration of $1\frac{1}{2}$ G, element 14 is caused to slide to the $\frac{3}{4}$ point along the length of the resistive element Rp as indicated by the slide element shown in phantom. In this case, $V_O$ is equal to $-9$ volts ($\frac{3}{4}$ of the excitation voltage) while the voltage at T3 remains at $-6$ volts, thereby resulting in a difference of $-3$ volts. Let it now be assumed that the excitation voltage changes from $-12$ volts DC to $-10$ volts DC. In this case, the voltage $V_O$ at an acceleration of 1 G is $-5$ volts ($\frac{1}{2}$ of the excitation voltage). At the same time, the voltage at T3 is also at $-5$ volts, again resulting in a differential of zero. However, at the sensed acceleration of $1\frac{1}{2}$ G, $V_O$ becomes $-7.5$ volts ($\frac{3}{4}$ of the excitation voltage). However, the voltage at T3 remains at $-5$, resulting in a differential of $-2.5$ volts. This 2.5 volt differential is different than the 3 volt differential which resulted under the very same circumstances except at an excitation voltage of $-12$ volts instead of $-10$ volts. In other words, because of the change in the scale factor of at the potentiometer as a result of the change im amplitude of the excitation voltage, a significant error results at the output of the accelerometer.

In view of the foregoing, one object of the present invention is to eliminate the foregoing problems associated with the previously described accelerometer 10 in an uncomplicated, economical and yet reliable fashion.

A more specific object of the present invention is to replace the potentiometer 12 and acceleration sensing mechanism 14 in accelerometer 10 with an uncomplicated, relatively economical and reliable arrangement which is compatible with the other components making up the accelerometer to provide the previously described voltage $E_O$ at the output of amplifier 18.

Another specific object of the present invention is to modify an otherwise conventional pendulous accelerometer in order to utilize the latter as the replacement device referred to immediately above.

Still another object of the present invention is to provide a replacement arrangement which does not have either structurally or functionally a scale factor or sensitivity which changes with excitation voltage and, hence, does not include the previously described drawback associated therewith.

As will be described in more detail hereinafter, the present invention utilizes a modified pendulous accelerometer. Except for the modification, the accelerometer can be of the conventional type which utilizes a pendulous member attached to a torque coil. The pendulous member pivots about a predetermined hinge axis toward or away from one or more pickoff coils depending upon the acceleration to which the member is subjected, producing an output voltage signal proportional to its displacement at the pickoff. At the same time, the torque coil, driven by the output voltage signal, functions to restore pendulous member to a nulled position relative to the pickoff assembly. The amount of current in the torquer necessary to restore the pendulous member to its nulled position, corresponds to the acceleration to which the pendulous member is subjected. This restoration current, which is readily converted to a voltage, is independent of the excitation voltage and cannot readily replace the voltage $V_O$ produced by the previously described potentiometer 12 and associated acceleration sensing mechanism 16 since $V_O$ is dependent upon excitation voltage.

In accordance with the present invention, an arrangement is provided which replaces potentiometer 12 and acceleration sensing mechansim 16, which arrangement is compatible with and uses the existing excitation voltages supply V(EX), the existing voltage divider 20 and the existing differential amplifier in producing output voltage $E_O$. This arrangement utilizes (1) a voltage identical to the reference voltage at terminal T3, (2) means operating on the excitation voltage for sensing acceleration and producing a first preliminary or initial voltage which is proportionate in amplitude to the acceleration sensed but which is independent of the excitation voltage and (3) summing means connected with the acceleration sensing means just mentioned and the voltage providing means for adding together the first preliminary or initial voltage and the voltage identical to the reference voltage and producing a second initial voltage having an amplitude equal to the sum of the added voltage. This second initial voltage replaces voltage $V_O$ produced at the output of the potentiometer. In a preferred embodiment, the conventional pendulous accelerometer discussed above serves as the last mentioned acceleration sensing means and the voltage providing means and summing means modifies this latter accelerometer by adding to its output signal a percentage of the excitation voltage so that the output from the pendulous accelerometer is dependent on excitation voltage and hence compatible with differential amplifier 18 of accelerometer 10.

The preferred arrangement which is utilized for replacing potentiometer 12 and acceleration sensing mechanism 16 will be described hereinafter in conjunction with the drawings wherein:

FIG. 1 (previously discussed) is a schematic illustration of a prior art linear accelerometer including a potentiometer and associated acceleration sensing mechanism; and FIG. 2 is an arrangement designed in accordance with the present invention to replace the potentiometer and acceleration sensing mechanism in the accelerometer of FIG. 1.

With reference to the drawings, FIG. 1 has been described previously and will not be discussed in further detail.

By way of background, a large number of missile guidance systems include these accelerometers making it impractical from an economical standpoint to replace them in their entirety with new accelerometers. In accordance with the present invention, only the potentiometer 12 and acceleration sensing mechanism 16 are replaced, as indicated by the dotted box in FIG. 1.

Potentiometer 12 and mechanism 16 are replaced with an overall arrangement 22 which is illustrated in FIG. 2. This arrangement includes a pendulous accelerometer 24 (contained within the dotted box of FIG. 2) of the type described previously. While not shown, pendulous accelerometer 24 utilizes an overall housing including an internal pendulous member attached to a torque coil (pivotally mounted within the housing). The torque coil is illustrated in FIG. 2 at 26. The pendulous accelerometer operates in a well known way. The pendulous member is supported in a variable position with respect to one or more pickoff coils, one of which is shown in FIG. 2 at 28. The pendulous member responds to acceleration to move either away or towards a given pickoff coil or coils. By means of a servomechanism, the torque coil 26 which is located within a fixed magnetic arrangement is excited with sufficient current to restore the pendulous member to its initial, predetermined position. This restoration current indicated at Ir in FIG. 2 is proportional in magnitude to the acceleration but is independent of the voltage operating on the pendulous accelerometer and specifically exciting the torque coil. In the actual embodiment illustrated, the pendulous member (not shown) is supported so as to be subjected to an acceleration of 1 G at rest. Under these circumstances, the amplitude of restoration current Ir corresponds to an acceleration of 1 G. This has been provided in order to make the overall arrangement 22 compatible with the actual working embodiment of overall accelerometer 10.

It should be apparent from FIG. 2 that pendulous accelerometer 24 includes a number of other components over and above torque coil 26 and pickoff coil or coils 28 which are shown in FIG. 2, and the accelerometer housing, pendulous member and magnetic arrangement which are not shown. These other components include the additional electrical circuitry shown in FIG. 2 as well as mechanical features which are not shown but which are well known in the art. The circuitry shown in conjunction with the mechanical features of the accelerometer operate in a well known way to provide the described restoration current and hence will not be described in further detail herein. It should suffice to say that in an actual working embodiment, the circuitry provided is that shown. The amplifiers AR1 and AR2 are LM10H operational amplifiers by National Semiconductors, Inc. The other components should be self-explanatory. The diode 30 has been provided across the terminals T1 and T2 in FIG. 2 in order to insure the proper polarity is maintained between arrangement 22 and the existing power terminals for accelerometer 10. The combination of capacitors C1 and resistor R3 which have been shown outside the dotted box of pendulous accelerometer 24 but which actually comprise part of the latter serves as a dynamic range changer which is known in the art.

As stated above, the restoration current Ir at the output of pendulous accelerometer 24 is proportionate in amplitude to the acceleration sensed but is independent of the excitation voltage and, hence, not compatible with the components of accelerometer 10 which have not been replaced. Therefore, in accordance with the present invention, overall arrangement 22 includes circuitry 32 (with the exception of the dynamic range changing combination of capacitor C1 and resistor R3) serving to make the output at the arrangement compatible with the unreplaced components of accelerometer 10. More specifically, as seen in FIG. 2, circuitry 32 includes a gain stage operational amplifier 34 including a resistor network 36 and filter capacitor C2 connected across the negative input and the output of the amplifier. The resistor network includes resistors R4, R5, and R6. The value of resistor R4 is predesigned while the values of resistors R5 and R6 are preferably determined at the time the overall arrangement is assembled in order to adjust for the proper scale. The other input of amplifier 34, i.e., its positive input, is connected to a center terminal T4 of a voltage divider 38 consisting of resistors R7 and R8 which are selected to be identical to previously described resistors R1 and R2 forming voltage divider 20. The output of amplifier 34 is connected to an output terminal T5 through an output resistor R9.

In addition to the foregoing, circuitry 32 includes a current sink generally indicated at 40 in FIG. 2. This current sink includes a gain stage operational amplifier 42, an internal voltage reference 44, a field effect transistor 46 and a network 48 of resistors R10, R11 and R12 connected together in the manner shown. The function of this latter circuitry is to divert an adjusted amount of restoration current Ir away from gain stage operational amplifier 34 and its associated circuitry so that the diverted current has no effect on this last mentioned amplifier and its circuitry. As will be seen below, the amount of current diverted corresponds to the null acceleration value, e.g., the acceleration to which the pendulous member is subjected when at rest which, in the present embodiment, is an acceleration of 1 G. The resistors R10, R11 and R12 are selected to this end.

Having described arrangement 22 structurally, attention is now directed to the way in which the arrangement modifies pendulous accelerometer 24 making the latter compatible with the non-replaced components of accelerometer 10. Under a normal null situation, the restoration current Ir corresponds to an acceleration of 1 G as stated previously. This 1 G of current is diverted to ground by the current sink 40 and, therefore, never affects the output of amplifier 34 at terminal T5. However, at the same time, the positive input of the amplifier is connected to the terminal T4 of the voltage divider 38. Since this voltage divider is identical to the previous voltage divider 20 and is connected across the same voltage supply, e.g., the excitation voltage V(EX), the voltage at T4 is the same as the voltage at T3 in FIG. 1. Moreover, the voltage at output terminal T5 is equal to the sum of the voltages at the two inputs of amplifier 34. Therefore, under these circumstances, the voltage at terminal T5 which is designated by $V_O'$ is one half the excitation voltage or $-6$ volts when the excitation voltage is $-12$ volts. Should the excitation voltage fluctuate down to, for example $-10$ volts under these circumstances, the voltage $V_O'$ would be $-5$ volts DC. As the acceleration to which the pendulous member is subjected increases from its 1 G value, the additional restoration current over and above the 1 G value is actually applied to the operational amplifier 34 and its associated circuitry so as to increase $V_O'$ accordingly. The circuitry is scaled so that for each 1 G increase in acceleration, the voltage $V_O'$ increases by 6 volts thereby corresponding to the circuitry making up previously described accelerometer 10. Hence, if for example the pendulous member is subjected to an increase in acceleration of $\frac{1}{2}$ G, the voltage at $V_O'$ will increase from negative 6 volts to negative 9 volts in amplitude at terminal T5.

From the foregoing, it should be apparent that the voltage $V_O'$ not only corresponds to the actual acceleration sensed but is also dependent upon the excitation voltage.

More specifically, the voltage $V_O'$ corresponds to the previously described voltage $V_O$ at the output of potentiometer 12. From a functional standpoint, there is only one difference between the voltages $V_O'$ and $V_O$. As stated previously, the voltage $V_O$ is subject to a scale factor change across the resistive element of potentiometer 12 when the excitation voltage V(EX) fluctuates. This was illustrated in the previously provided example where a change of excitation voltage from negative 12 volts DC to negative 10 volts DC resulted in a change in voltage $V_O$ from minus 9 VDC to minus 7.5 VDC resulting in differential output $E_O$ (see FIG. 1) of 3 volts DC and 2.5 volts DC corresponding to the different excitation voltages. In the case of arrangement 22, the scale does not change. Using the same example, at an excitation voltage of negative 12 volts DC and an acceleration of 1.5 G, the voltage $V_O'$ at terminal T5 is negative 9 volts DC for the reasons stated previously. This voltage is applied to the negative input of differential amplifier 18 resulting in the voltage output $E_O$ of 3 volts DC. With an excitation voltage of minus 10 volts DC and an acceleration value of 1.5 G, the voltage value $V_O'$ at terminal T5 is 8 volts which should be contrasted with the 7.5 voltage value of $V_O$ under the same circumstances. The reason for this difference is that in arrangement 22, the restoration current and, hence, the associated voltage is not affected in any way by the excitation voltage. Therefore, at an acceleration of 1.50 G, the amount of voltage contributed thereby to the voltage $V_O'$ is 3 volts regardless of the change in excitation voltage from $-12$ volts to $-10$ volts. However, the voltage at terminal T4 does change from 6 volts to 5 volts leaving a voltage of 8 volts at $V_O'$. This voltage when applied to the differential amplifier 18 results in the same 3 volt differential at output EO as is the case when the excitation voltage is 12 volts DC. In other words, the scaling in arrangement 22 is not affected by a change in excitation voltage. Otherwise, the voltages $V_O$ and $V_O'$ are identical. Therefore, this latter voltage can be readily used in place of the voltage $V_O$ in accelerometer 10.

The specific arrangement 22 illustrated in FIG. 2 including the specific values attributed thereto are provided to illustrate an actual working embodiment for exemplary purposes only. It is understood that these values are not intended to limit the present invention.

What is claimed is:

1. An accelerometer comprising:
   (a) means for supplying an excitation voltage;
   (b) means operating on said excitation voltage for sensing acceleration and producing a first signal which corresponds to the acceleration sensed but which is independent of said excitation voltage;
   (c) means connected with said voltage supplying means for producing a second signal corresponding to a fixed proportion of said excitation voltage;
   (d) means connected with said first and second signal producing means for combining said first and second signals and producing a third signal corresponding thereto, said third signal being dependent on the acceleration sensed and said excitation voltage whereby fluctuations in the latter will cause fluctuations in said third signal; and
   (e) means connected with said second and third signal producing means for subtracting said second signal from said third signal and producing an output signal dependent on the acceleration sensed and independent of said excitation voltage.

2. A linear accelerometer comprising:
   (a) means for supplying a DC excitation voltage;
   (b) means operating on said voltage for sensing acceleration and producing a first output voltage which is proportionate in amplitude to the acceleration sensed but which is independent of said excitation voltage;
   (c) means connected with said voltage supplying means for providing a reference voltage having an amplitude equal to a fixed proportion of the amplitude of said excitation voltage;
   (d) summing means connected with said acceleration sensing means and said reference voltage providing means for adding said first output voltage and said reference voltage together and producing a second output voltage having an amplitude equal to the sum of the added voltages, the amplitude of said second output voltage being dependent on both the acceleration sensed and the excitation voltage whereby fluctuations in the latter will cause fluctuation in the amplitude of said second output voltage; and
   (e) signal differentiating means connected with said reference voltage providing means and said summing means for subtracting the amplitude of said reference signal from said second output signal and producing a third output voltage equal to said first output voltage.

3. An accelerator according to claim 2 wherein said reference voltage providing means includes first and second separate voltage dividers each of which is connected across said voltage supplying means for producing said reference voltage, said summing means being connected with said first voltage divider and said signal differentiating means being connected with said second voltage divider.

4. An accelerometer according to claim 3 wherein said reference voltage providing means includes a single voltage divider connected across said voltage supplying means for producing said reference voltage, each of said summing means and said signal differentiating means being connected with said voltage divider.

5. In an accelerometer including means for supplying a DC excitation voltage, a potentiometer having a resistive element connected across said voltage supply and a slide element mounted for movement along the length of and in engagement with said resistive element, means for mechanically sensing acceleration and placing said slide element in a particular position along said resistive element depending upon the acceleration sensed for producing an initial voltage proportionate in amplitude to the acceleration sensed and dependent on said excitation voltage, voltage dividing means connected with said voltage supplying means for producing a reference voltage having an amplitude equal to a fixed percentage of the amplitude of said excitation voltage, and signal differentiating means connected with said voltage dividing means and said acceleration sensing means for producing an output signal which is dependent upon the difference between said initial voltage and said reference voltage and which corresponds to the acceleration sensed, an arrangement which replaces said potentiometer and said acceleration sensing means, which arrangement is compatible with and uses said voltage supplying means, voltage dividing means and signal differentiating means in producing said output signal, said arrangement comprising:
   (a) means for providing a voltage identical to said reference voltage;
   (b) means operating on said excitation voltage for sensing acceleration and producing a first initial voltage which is proportionate in amplitude to the acceleration sensed but which is independent of said excitation voltage; and summing means connected with said acceleration sensing means and said voltage providing means for adding together said first initial voltage and said voltage identical to said reference voltage and producing a second initial voltage having an amplitude equal to the sum of the added voltages, said second initial voltage replacing said initial voltage produced as a result of said mechanical acceleration sensing means.

6. An arrangement according to claim 5 wherein said voltage providing means includes a second voltage dividing means connected with said voltage supplying means for producing said voltage identical to said reference voltage.

7. An arrangement according to claim 5 wherein said voltage providing means includes said voltage dividing means for providing said voltage identical to said reference voltage.

8. An arrangement according to claim 5 wherein said reference voltage has an amplitude one-half the amplitude of said excitation voltage.

9. In an accelerometer including means for supplying a DC excitation voltage, a potentiometer having a resistive element connected across said voltage supply and a slide element mounted for movement along the length of and in engagement with said resistive element, means for mechanically sensing acceleration and placing said slide element in a particular position along said resistive element depending upon the acceleration sensed for producing an initial voltage proportionate in amplitude to the acceleration sensed and dependent on said excitation voltage, voltage dividing means connected with said voltage supplying means for producing a reference voltage having an amplitude equal to a fixed percentage of the amplitude of said excitation voltage, and signal differentiating means connected with said voltage dividing means and said acceleration sensing means for producing an output signal which is dependent upon the difference between said initial voltage and said reference voltage and which corresponds to the acceleration sensed, a method of replacing said potentiometer and said acceleration sensing means with an arrangement which is compatible with and uses said voltage supplying means, voltage dividing means and signal differentiating means in producing said output signal, said method comprising:

(a) providing a voltage identical to said reference voltage;

(b) operating on said excitation voltage for sensing acceleration producing a first initial voltage which is proportionate in amplitude to the acceleration sensed but which is independent of said excitation voltage; and (c) adding together said first initial voltage and said voltage identical to said reference voltage and producing a second initial voltage having an amplitude equal to the sum of the added voltages, said second initial voltage replacing said initial voltage produced by said mechanical acceleration sensing means.

* * * * *